United States Patent [19]

Sugita et al.

[11] Patent Number: 4,622,712
[45] Date of Patent: Nov. 18, 1986

[54] WIPER BLADE RUBBER

[75] Inventors: Hiroshi Sugita, Tchinomiya; Takemasa Yasukawa, Inazawa; Masanori Aritake, Nishikasugai, all of Japan

[73] Assignee: Toyoda Gosei Co., Ltd., Nishikasugai, Japan

[21] Appl. No.: 668,859

[22] Filed: Nov. 6, 1984

[30] Foreign Application Priority Data

Nov. 7, 1983 [JP] Japan .............................. 58-172904[U]
Nov. 7, 1983 [JP] Japan .............................. 58-172905[U]
Nov. 7, 1983 [JP] Japan .............................. 58-172906[U]
Nov. 8, 1983 [JP] Japan .............................. 58-172711[U]
Nov. 8, 1983 [JP] Japan .............................. 58-172712[U]

[51] Int. Cl.$^4$ ............................................. B60S 1/38
[52] U.S. Cl. ........................... 15/250.36; 264/340; 428/492
[58] Field of Search ................ 15/250.36–250.42; 428/156, 174, 492; 264/340

[56] References Cited

U.S. PATENT DOCUMENTS

| | | | |
|---|---|---|---|
| 3,035,297 | 5/1962 | Overman et al. | |
| 3,116,506 | 1/1964 | Browne et al. | 15/250.36 |
| 3,121,133 | 2/1964 | Mathves | 15/250.36 X |
| 3,882,567 | 5/1975 | Herzog | 15/250.36 |
| 4,045,838 | 9/1977 | Porter | 15/250.36 |

FOREIGN PATENT DOCUMENTS 3214267 10/1983 Fed. Rep. of Germany .

*Primary Examiner*—Peter Feldman
*Attorney, Agent, or Firm*—Cushman, Darby & Cushman

[57] ABSTRACT

A wiper blade rubber of a constant cross section, composed of at least two kinds of rubber ingredient and manufactured by multi-color extrusion molding. In a wiper blade rubber according to this invention, a lip portion thereof to be in sliding contact with the glass surface is formed of a lubricating rubber and a swing portion generally of a trigonal cross section is mostly formed of a flexible rubber. In another wiper blade rubber according to this invention, a central part at the bottom end of the lip portion is formed of a high frictional rubber and both side parts of the bottom end of the lip portion is formed of a lubricating rubber. In a further wiper blade rubber according to this invention, an engaging part of the base portion, in the form of grooves or ridges, for engagement with an elongate rigid body held by a yoke of a wiper, is formed of a lubricating rubber and the swing portion is mostly formed of a flexible rubber. In these wiper blade rubbers, a portion or a part thereof to be subjected to sliding movement is formed of a lubricating rubber, a swing portion thereof is formed of a flexible rubber and a part not to slide is formed of a high friction resistant rubber. These portions and parts are also formed in one piece. Therefore, according to this invention, it is possible to dispose rubber materials at suitable positions for function of the respective wiper blade rubbers, and the integrality thereof is high and the durability thereof is also excellent.

22 Claims, 13 Drawing Figures

WIPER BLADE RUBBER

BACKGROUND OF THE INVENTION

1. Field of the Invention

This invention relates to an improvement of a wiper blade rubber.

The wiper blade rubber is an elongate member integrally comprising a thick base portion, a swing portion generally of a trigonal cross section, a neck portion connecting the base portion and the swing portion and a thin plate-like lip portion disposed at the bottom end of the swing portion, and it is used as a wiping member of a wiper. The wiper blade rubber moves slidably along the glass surface of a front glass of an automobile or the like and serves to remove water droplets on the surface of the glass by the sliding movement.

2. Description of the Prior Art

Conventionally, in order to obtain a wiper blade rubber, an unvulcanized rubber material, which is previously blended, has been molded in a metal die to be vulcanized and then the surface of the resulting rubber has been treated to reduce the sliding resistance thereof in accordance with requirement. As the aforesaid surface treatment, for instance, a method of hardening the surface of the wiper blade rubber by chlorination or a method of coating to form a surface layer containing fine lubricating powder such as of molybdenum disulfide on the surface of the wiper blade rubber. However, although the chlorinating method has an advantage of reducing the sliding resistance, it lacks in the wear-resistance. On the other hand, while the method of forming the coating layer containing fine lubricating powder involves a problem in that the coating layer is peeled off during a short period of use and lacks in durability.

Further, an attempt for improving the sliding movement characteristic of the wiper blade rubber by decreasing the frictional coefficient between the wiper blade rubber and the glass surface brings about problems in that the wiper blade rubber does not swing at the neck portion but the swing portion and the lip portion of the wiper blade rubber move slidably while remaining tilted in one direction.

SUMMARY OF THE INVENTION

A primary object of this invention is to provide a wiper blade rubber which is stable in the sliding movement characteristic and which has good durability.

Another object of this invention is to provide a wiper blade rubber having an excellent wear-resistance as well as a small sliding resistance.

A further object of this invention is to provide a wiper blade rubber having a low sliding resistance, stabilized in the wiping operation and with a good durability.

A still further object of this invention is to provide a wiper blade rubber having a small sliding resistance and facilitated in assembly.

DESCRIPTION OF THE INVENTION

The wiper blade rubber according to the present invention is an elongate wiper blade rubber of a constant cross section, which comprises a thick base portion, a swing portion generally of a trigonal cross section, a neck portion interposed between the base portion and the swing portion, and a thin plate-like lip portion disposed at the bottom end of the swing portion, and in said constant cross section of the wiper blade rubber, one part thereof being composed of a first rubber composite and the other part thereof being composed of a second rubber composite, and the first and second rubber composites being integrally extrusion molded and then vulcanized.

The outer shape of the wiper blade rubber according to this invention is basically the same as that of the conventional wiper blade rubber. Specifically, the wiper blade rubber according to this invention comprises a base portion, a swing portion, a neck portion and a lip portion.

The base portion referred to herein means a portion attached with a steel piece held by a yoke in order to obtain a rigidity in the longitudinal direction of the wiper blade rubber. The base portion is in the form of a rod having grooves or ridges on both sides thereof for engagement with the steel piece.

The swing portion is generally of a trigonal cross section and in continuous with the base portion by way of a thin neck portion. The neck portion is disposed at the center on the bottom of the generally trigonal cross section. The swing portion swings upon reciprocal sliding movement leftwardly and rightwardly on the glass surface and bends rightwardly and leftwardly at the neck portion, whereby the swing portion swings leftwardly and rightwardly relative to the base portion.

The lip portion denotes a thin plate-like protruded portion disposed at the bottom peak of the generally trigonal cross section of the swing portion. The bottom end of the lip portion is formed into a rectangular cross sectional shape and the linear corner (edge) defined with each of the side surfaces and the bottom end surface of the lip portion are mainly in slidable contact with the glass surface. The side parts of the lip portion means such a portion as has one of the linear corners. Further, the central part forming the central area at the bottom end surface of the lip portion denotes a portion put between the two aforementioned side parts.

A first aspect of this invention is directed to a wiper blade rubber wherein at least most of the base portion and swing portion are composed of a flexible rubber belonging to the first rubber composite and at least most of the lip portion is composed of a lubricating synthetic rubber belonging to the second rubber composite.

As the flexible rubber, a natural rubber and a rubber mixture such as of natural rubber and chloroprene rubber or natural rubber and SBR are best suited. The rubber hardness is preferably between about 50 and about 70 under the standard of JIS(Japanese Industrial Standard) K 6301. The flexible rubber can be blended, in addition to the rubber ingredient, with such ingredients as carbon black, vulcanizing agent and filter.

The lubricating synthetic rubber mainly constituting the lip portion is composed of a synthetic rubber such as urethane rubber, SBR, butyl rubber, fluoro rubber, chlorosulfonated rubber or the like. Powders of lubricants such as graphite, molybdenum disulfide and the like, may be added into this lubricating synthetic rubber to reduce the frictional coefficient of the wiper blade rubber. The average particle diameter of the lubricant is, preferably, about 0.3 to 10$\mu$.

In the wiper blade rubber according to this invention, these flexible rubber and lubricating synthetic rubber are extrusion molded in multi-colors and then the extruded molded material is simultaneously vulcanized. In this case, therefore, the vulcanizing conditions, such as vulcanizing temperatures and the like, for the respective flexible rubber and lubricating synthetic rubber, are preferably the same. For example, as for urethane rubber, it is preferable that block isocyanate, is used, wherein isocyanate is blocked by phenol or the like with polyalcohol having a large molecular weight and being in a solid state at normal temperature. By using the aforesaid urethane rubber and the flexible rubber mainly composed of a natural rubber are integrally extrusion molded in two-colors and then they can be simultaneously heated to be vulcanized.

The lubricating synthetic rubber is, the most preferably, disposed to only the both side parts at the bottom end of the lip portion. In this case, the central part at the bottom end of the lip portion is composed of a flexible rubber and the flexible rubber is exposed at the surface thereof. The respective thicknesses of lubricating synthetic rubber disposed at the both side parts of the lip portion are, each preferably, about 1/10 to ⅓ compared with the thickness of the lip portion.

On the other hand, the flexible rubber and the lubricating synthetic rubber may be formed to have concave and convex shapes at the boundary portions thereof to be contacted each other with the larger surfaces. Such concave and convex portions are engaged into each other like an anchor to obtain the integral nature thereof in a mechanical manner. Particularly, the aforesaid method is effective in the case of poor affinity of the flexible rubber and the lubricating synthetic rubber.

The wiper blade rubber according to the first aspect of this invention is manufactured by extrusion molding. In the manufacturing method, at first, respectively unvulcanized pieces of rubber to be formed into flexible rubber and lubricating synthetic rubber constituting the wiper blade rubber are extrusion molded in multi-colors (two colors) into an elongate molded item of a constant cross section. The molded item is a thin plate-like elongate member of a constant cross section, in which two wiper blade rubber pieces are joined integrally at the bottom end of the respective lip portions. The extruded molded material is heated to be vulcanized at the vulcanizing temperature, then a cutting blade is inserted into the central part forming the lip portion to cut out the same into wiper blade rubber pieces.

The extrusion molding process itself can utilize the conventional multi-color extrusion molding process as it is. However, since the thickness of the lip portion of the wiper blade rubber is extremely thin such as 0.5–1.0 mm, a high extrusion molding technique is required. In the relevant field of art to which the present inventors belong, multi-color rubber extrusion product of about 0.1 mm thickness can be manufactured stably.

In the wiper blade rubber according to the first aspect of this invention, the base portion, the neck portion and the swing portion thereof requiring flexibility are mainly composed of the flexible rubber having a high flexibility. The flexible rubber consists essentially of a natural rubber. The lip portion requiring an excellent sliding movement characteristic is mainly composed of the lubricating synthetic rubber, such as urethane rubber or the like, having excellent frictional characteristics such as a low frictional coefficient and a good wear resistance. Both of the flexible rubber and lubricating synthetic rubber are integrally extrusion molded by means of multi-color extrusion molding and then vulcanized. Therefore, the wiper blade rubber according to the first aspect of this invention provides excellent frictional characteristic as well as flexibility required for a wiper blade rubber.

Moreover, since the flexible rubber and the lubricating synthetic rubber are integrally extrusion molded in a not yet vulcanized state and then they are vulcanized simultaneously, the physical integrity thereof is strong, resulting in less possibility of separation between them.

On the other hand, in the case where the both side parts at the bottom end of the lip portion are constituted with the lubricating synthetic rubber and the central part thereof interposed between the aforesaid both side parts is constituted with the flexible rubber so as to expose the flexible rubber at the bottom end of the lip portion, the flexible rubber of a large frictional coefficient is exposed at the central part of the bottom end of the lip portion. Therefore, when the wiper blade rubber incorporated into a wiper moves reciprocally on the glass surface are in contact with each other at the point where the direction at the sliding movement of the wiper changes. At this time, the central part at the bottom end of the lip portion with a high frictional coefficient is in contact with the glass surface to obtain a high frictional resistance. Accordingly, upon inversion of the wiper, the lip portion is temporarily held on the glass surface and the base portion of the wiper blade rubber is reversed in the opposite direction being biased from the wiper. Then, in the reversed state, the base portion pulls the swing portion and, further, the lip portion at the bottom end of the swing portion follows after it. Accordingly the lip portion always follows after the base portion of the wiper and the glass surface is always in sliding contact at the corner between the bottom end and the side of the lip portion to eliminate water droplets. Consequently, water droplets can be eliminated more surely from the glass surface.

A second aspect of this invention is directed to a wiper blade rubber in which at least most of the base portion and swing portion are composed of a flexible rubber having a rubber hardness of 50 to 70 degrees and belonging to the first rubber composite, and at least most of the lip portion is composed of a hard rubber belonging to the second rubber composite and having a rubber hardness higher at least by 10 degrees as compared with that of the aforesaid flexible rubber. The rubber hardness referred to herein means a hardness standardized in JIS K 6301.

In the wiper blade rubber according to the second aspect of this invention, the lip portion thereof to move slidably on the glass surface is composed of a hard rubber having a small sliding resistance and an excellent wear resistance, while the base portion and the swing portion thereof requiring flexibility are composed of a flexible rubber. These portions are integrally extrusion molded. Therefore, the wiper blade rubber of this second aspect provides a flexibility required for a wiper blade rubber as well as a small sliding resistance and an excellent wear resistance, because the lip portion thereof to be in sliding contact with the glass surface is formed of a hard rubber.

As the flexible rubber according to the second aspect, a natural rubber; a rubber mixture such as of natural rubber and choloroprene rubber or of natural rubber and SBR; or a synthetic rubber such as SBR, EPDM, NBR, urethane rubber or the like, can be employed. The rubber hardness thereof is basically the same as that of the conventional wiper blade rubber.

To form the hard rubber according to this second aspect, a solid filler such as carbon black or the like may be much blended, or the cross linking degree of the vulcanization carried out may be increased. Or otherwise, an inorganic lubricant such as molybdenum disulfide or the like may be blended in to increase the rubber hardness. In addition, a hard rubber, such that a rubber itself has a high hardness, such as urethane rubber or the like, may be employed for this purpose.

The hard rubber, the most preferably, is only disposed to the both side parts at the tip end of the lip portion, as explained in the foregoing first aspect of this invention.

The wiper blade rubber according to the second aspect of this invention has the same flexibility and sliding characteristic as that of the first aspect of this invention. The manufacturing method of the wiper blade rubber according to this second aspect is also basically the same as that of the wiper blade rubber according to the first aspect of this invention.

A third aspect of this invention is directed to a wiper blade rubber in which at least most of the base portion and the swing portion are composed of a rubber having a small content of lubricant and belonging to the first rubber composite, and at least most of the lip portion is composed of a rubber having a large content of lubricant and belonging to the second rubber composite.

As the flexible rubber according to the third aspect of this invention, a natural rubber and a rubber mixture such as of natural rubber and chloroprene rubber or of natural rubber and SBR, NBR, ERDM and the like, may be also employed. It is not preferable to blend the flexible rubber with a lubricant, except the particular case. To blend the flexible rubber with a lubricant is caused to decrease the flexibility of rubber in many cases.

As the lubricating rubber containing a large amount of lubricant, there can be employed a rubber containing a powder of graphite, molybdenum disulfide, fluoro resin, lubricating oils or the like.

The blending ratio of the lubricant in this lubricating rubber is preferably 10 to 50 percent by volume. The particle diameter thereof is preferably 0.1 to $10\mu$. As a rubber ingredient of the lubricating rubber, the same rubber as the aforesaid flexible rubber may be employed and different rubbers may be also employed. The lubricating rubber is most preferably disposed to the both side parts at the bottom end of the lip portion.

The wiper blade rubber according to the third aspect of this invention has the same flexibility and sliding characteristics as those of the first aspect of this invention. The manufacturing method of the wiper blade rubber according to this third aspect is also basically the same as that of the wiper blade rubber according to the first aspect of this invention.

A fourth aspect of this invention is directed to a wiper blade rubber in which at least a central part at the bottom end of the lip portion is composed of a high frictional rubber having a high frictional coefficient and belonging to the first rubber composite, and at least a side parts defining both sides at the bottom end of the lip portion is composed of a lubricating rubber having a low frictional coefficient and belonging to the second rubber composite.

The high frictional rubber constituting at least the central part of the lip portion has a frictional coefficient higher than that of the lubricating rubber constituting the side parts thereof. The high frictional rubber usable herein includes a rubber with a reduced rubber hardness and a rubber with an increased frictional coefficient by including a blended in an additive such as tackifier, process coil or the like. Particularly, the high frictional rubber is preferable to be a rubber mainly composed of a natural rubber, having about 50 to 70 degree of rubber hardness (under hardness of JIS K 6301).

The lubricating rubber constituting the both side parts at the bottom end of the lip portion has a low frictional coefficient. As the aforesaid rubber, a hard rubber having a rubber hardness increased at least by 10 degree than that of the high frictional rubber, a rubber containing lubricants such as graphite, molybdenum disulfide and lubricating oils, or lubricating sybthetic rubber such as urethane rubber, SBR, butyl rubber, fluoro rubber, chloro-sulfonated rubber or the like, can be represented. Specifically, both of the high preferably frictional rubber and the lubricating rubber are composed of a rubber ingredient of a natural rubber, wherein the rubber hardness of the lubricating rubber is increased by more than about 10 degree by increasing the blending amount of carbon black or the like, or the lubricating rubber is blended with a lubricant such as molybdenum disulfide or the like to reduce the frictional coefficient thereof to less than about 0.8 to 1.2. Further, the high rubber may be composed of a rubber ingredient consisting essentially of a natural rubber, while the lubricating rubber is composed of a rubber ingredient consisting essentially of urethane rubber, SBR, butyl rubber, fluoro rubber, chloro-sulfonated rubber or the like.

The width of the side part exposed at the bottom end surface of the lip portion is preferably about 1/10 to ⅓ relative to the width of the bottom end thereof. Therefore, it is preferable that the width of the central part exposed at the bottom end surface of the lip portion is about ⅓ to 4/5 relative to the width of the top end thereof.

The base portion and swing portion are preferably formed of a flexible rubber mainly composed of a natural rubber. As the flexible rubber, a natural rubber, a rubber mixture such as of natural rubber and chloroprene rubber or of natural rubber and SBR are best suited. The rubber hardness thereof is preferably about 50 to 70 degree. The flexible rubber can be blended, in addition to the aforesaid rubber ingredient, with such an ingredient as carbon black, vulcanizing agent or filler.

The wiper blade rubber according to the fourth aspect of this invention is manufactured by extrusion molding. In this manufacturing method, respectively unvulcanized pieces of rubber, to be formed into the high frictional rubber and lubricating rubber, or the high frictional rubber, the lubricating rubber and flexible rubber, constituting the wiper blade rubber, are extrusion molded in multi-colors (two or three colors) into an elongate molded item of a constant cross section. The molded item is a thin plate-like elongate member of a constant cross section, in which two wiper blade rubber pieces are joined integrally at the bottom end of the respective lip portions. The extrusion molded item is heated to be vulcanized at the vulcanizing temperature, and then a cutting blade is inserted into the center of the respective lip portions to cut out the same into two wiper blade rubber pieces.

In the wiper blade rubber according to the fourth aspect of this invention, both side parts at the bottom end of the lip portion requiring an excellent sliding characteristic are mainly composed of a lubricating rubber of an excellent sliding characteristic, and a central part at the bottom end of the lip portion is composed of a high frictional rubber. Both of them are molded by integral multi-color extrusion and then vulcanized. Accordingly, the wiper blade rubber according to this fourth aspect has a low frictional coefficient at the side portion of the lip portion required upper sliding of the wiper blade rubber, as well as a high friction coefficient at the central part of the lip portion required upon swinging of the wiper blade rubber.

Therefore, when the wiper blade rubber incorporated into a wiper moves reciprocally on the glass surface, the bottom end of the lip portion of the wiper blade rubber and the glass surface are in contact with each other at the point where the direction of the sliding movement changes, whereby the central part at the bottom end of the lip portion with a high frictional coefficient is in contact with the glass surface to obtain a high friction resistance. Accordingly, upon inversion of the wiper, the lip portion is temporarily held on the glass surface and the base portion of the wiper blade rubber is reversed in the opposite direction being biased from the wiper. Then, in the reversed state, the base portion pulls the swing portion and, further, the lip portion follows after the base portion of the wiper and the glass surface is always in sliding contact at the corner between the bottom end and the side of the lip portion to eliminate water droplets. Consequently, water droplets can be eliminated more surely from the glass surface.

A fifth aspect of this invention is directed to a wiper blade rubber in which the base portion thereof is provided with an engaging part in the form of grooves or ridges, for engagement with an elongate rigid body held by a yoke, and at least the engaging part is composed of a lubricating rubber belonging to the second rubber composite and having a frictional coefficient lower than that of a flexible rubber belonging to the first rubber composite and constituting the neck portion and the swing portion.

The base portion referred to herein means a portion attached with the rigid body held by a yoke in order to obtain a rigidity in the longitudinal direction of the wiper blade rubber. The base portion is in the form of a rod having the engaging part such as of grooves or ridges on both sides thereof for engagement with the rigid body.

At least the engaging part of the base portion is composed of a lubricating rubber. At least the engaging part referred herein includes not only a part forming the surface in contact with the rigid body but also a part nearby the aforesaid surface. In addition, all of the base portion may be also composed of a lubricating rubber.

The lubricating rubber means a rubber having a frictional coefficient lower than that of a rubber constituting the neck portion and the swing portion. The rubber may be a flexible rubber mainly composed of a natural rubber, the rubber hardness of which is about 50 to 70 degree. (The rubber hardness referred herein means rubber hardness standardized in JIS K 6301) Therefore, as the lubricating rubber, there may be employed a hard rubber having a rubber hardness of higher than the flxible rubber by 10 degree or more; a rubber containing a lubricant such as graphite, molybdenum disulfide, fluoro resin, lubricating oils or the like; a rubber of which the rubber ingredient itself has a small frictional coefficient, such as urethane rubber, SBR, butyl rubber, fluoro rubber, chlorosulfonated rubber or the like.

Specifically, both of the flexible rubber and the lubricating rubber are formed of a rubber ingredient mainly composed of a natural rubber, such as a natural rubber, a rubber mixture of natural rubber and chloroprene rubber or of natural rubber and SBR, or the like. And then, as for the lubricating rubber, the rubber hardness hereof is increased by about 10 degree by increasing the blending amount of carbon black or the like, or the lubricating rubber is blended with a lubricant such as molybdenum disulfide or the like to reduce the frictional coefficient thereof to less than about 0.8 to 1.2. Whereas, the flexible rubber is formed of a rubber ingredient mainly composed of a natural rubber. The lubricating rubber may be also formed of a rubber ingredient mainly composed of urethane rubber, SBR, butyl rubber, fluoro rubber, sulfonated rubber or the like.

The swing portion and the neck portion are preferably constituted with a flexible rubber mainly composed of a natural rubber. The flexible rubber may be blended with carbon black, a vulcanizing agent, a filler in addition to the rubber ingredient.

The lip portion is preferably constituted with a lubricating rubber, if possible. However, it may be constituted with a flexible rubber in the same manner as the conventional wiper blade rubber.

The wiper blade rubber according to this fifth aspect of this invention is manufactured by extrusion molding. In this manufacturing method, respectively unvulcanized pieces of rubber, to be formed into the lubricating rubber and the flexible rubber constituting the wiper blade rubber, are extrusion molded in multi-colors (two colors) into an elongated molded item of a constant cross section. The molded item is a thin plate-like elongate member of a constant cross section, in which two wiper blade rubber pieces are joined integrally at the top end of the respective lip portions. The extruded molded item is heated to be vulcanized at the vulcanizing temperature, and then a cutting blade is inserted into the center of the respective lip portions to cut out the same into two wiper blade rubber pieces.

In the wiper blade rubber according to this fifth aspect, the neck portion and the swing portion requiring flexibility for the wiper blade rubber are mainly composed of a flexible rubber having a high flexibility, which consists essentially of a natural rubber. On the other hand, the engaging part of the base portion, to which the rigid body is to be assembled, requiring an excellent sliding characteristic, is mainly composed of a lubricating rubber having a low frictional coefficient. Both of the flexible rubber and the lubricating rubber are integrally molded by multi-color extrusion molding and then vulcanized. Accordingly, the wiper blade rubber according to the fifth aspect of this invention provides a flexibility required for the wiper blade rubber as well as an excellent smoothness characteristic required for the engaging part of the base portion when assembled to the rigid body.

EXAMPLE 1

Figure 1:
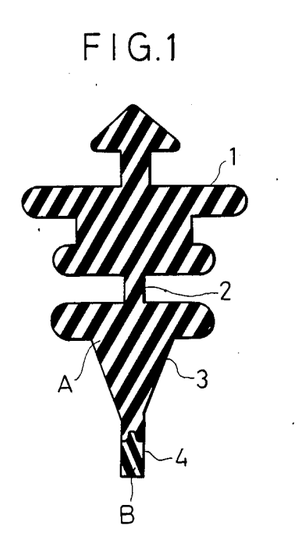
FIG. 1 is a cross sectional view of a wiper blade rubber as Example 1.

FIG. 1 shows a cross section of a wiper blade rubber as Example 1 according to this invention. The wiper blade rubber comprises a base portion 1 of a polygonal cross section, a neck portion 2, a swing portion 3 generally of a trigonal cross section and a lip portion 4 disposed to the bottom end of the swing portion 3. The base portion 1, neck portion 2, swing portion 3 and an upper end of the lip portion 4 are made of a flexible rubber A mainly composed of a natural rubber, the lower portion of the lip portion 4 is made of a lubricating synthetic rubber B composed of urethane rubber. The wiper blade rubber has a height of about 11.5 mm, a width of about 7 mm and the lip portion 4 has a thickness of 0.75 mm and a height of 1.9 mm. The wiper blade rubber was manufactured by the following method.

An unvalcanized rubber blend, composed of 100 parts by weight of a natural rubber (hereinafter parts means parts by weight) (containing 0.3 parts by weight of a diluent), 30 parts of FEF carbon, 3.5 parts of sulfur powder, 5 parts of zinc white, 2 parts of a processing aid, 3.2 parts of an aging stabilizer and 0.7 parts of a vulcanization promoter, was sufficiently mixed by using a Banbury mixer to prepare a flexible rubber material A'.

A material B' for the lubricating synthetic rubber B was prepared by sufficiently mixing in the same manner by a Banbury mixer a rubber blend composed of 100 parts of polyester ether (molecular weight 3000), 5 parts of 1,4-butanediol, 26 parts of xylenol block isocyanate and 2 parts of HF carbon.

Figure 2:
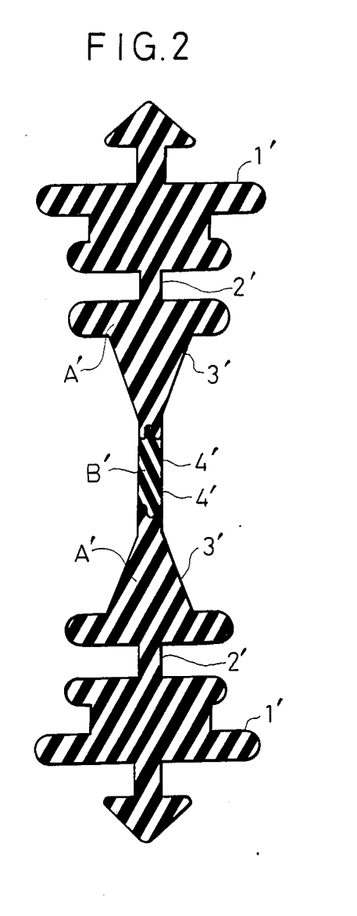
FIG. 2 is a cross sectional view of an extrusion molded product of unvulcanized rubber molded for manufacturing the wiper blade rubber shown in FIG. 1.

Then, the above-described two kinds of rubber material were extrusion molded in two colors to obtain an extrusion molded item of a cross sectional configuration as shown in FIG. 2 by extruding the material A' for forming the base portion, the neck portion and the swing portion from an extruder of a screw diameter in 35 mm and the material for forming the lip portion from an extruder of a screw diameter in 20 mm under the condition of the head temperature at 70° C. The extrusion molded item has a configuration in which two wiper blade rubber pieces are joined at the bottom end of the respective lip portions, with the unvulcanized lubricating synthetic rubber material B' being disposed at the center of the aforesaid item and the unvulcanized flexible rubber material A' being disposed at both sides thereof. Then, the extrusion molded item was vulcanized at 180° C. for 5 minutes using a molten salt vulcanizing vessel into a vulcanized rubber. Thereafter, the vulcanized rubber was cut along the center thereof with a sharp cutting blade to prepare a wiper blade rubber according to this invention, the cross section of which is shown in FIG. 1.

Figure 13:
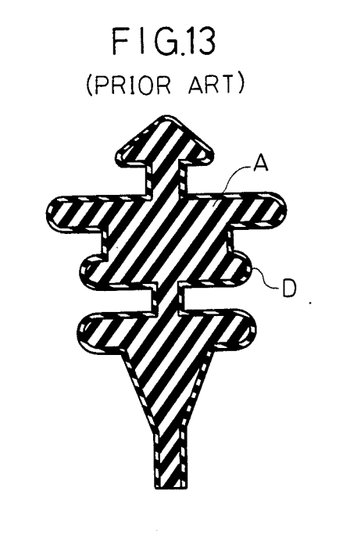
FIG. 13 is a cross sectional view of a wiper blade rubber of a comparative example.

As a comparative example, only the same unvulcanized flexible rubber material A' as shown in Example 1 was heat-molded under a pressure within a metal mold to prepare a wiper blade rubber. Then, the wiper blade rubber was immersed for 10 minutes in a chlorine processing liquid comprising 100 parts of water, 3 parts of sodium hypochlorite (effective chlorine 5 wt%) and 1 part of concentrated hydrochloric acid (HCL:35 wt%) to chlorinate the surface thereof thereby to prepare a comparative wiper blade rubber the cross section of which is shown in FIG. 13. In FIG. 13, reference D denotes a chlorinated rubber layer.

Figure 3:
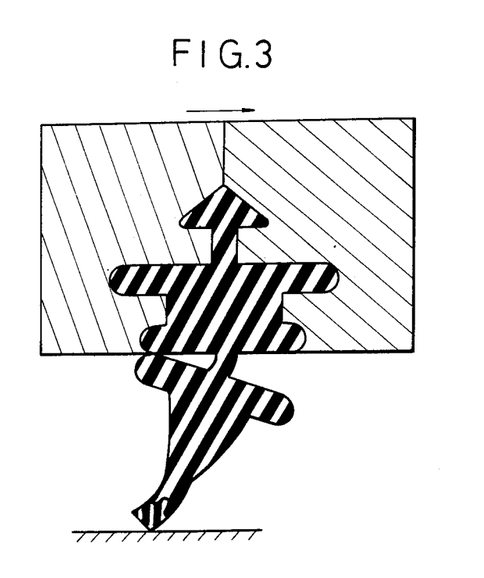
FIG. 3 is a cross sectional view of a part showing the state of the test for the wiper blade rubber.

The frictional coefficients of the wiper blade rubber of Example 1 according to this invention and the wiper blade rubber of the comparative example were measured in order to compare the sliding movement characteristics for both of them. In this test, as shown in FIG. 3, the wiper blade rubber, while being secured or mounted to a tester, was moved reciprocally at a rate of 35 cycles/minute over a 50 cm distance on a glass plate on which cold water was supplied intermittently while applying a pressure of $W=20$ gf/cm$\times$10 cm, and the frictional coefficients ($\mu$) in this state were measured. The frictional coefficient was a value obtained by dividing the tensile force (F) with a pressure (W). The repeating reciprocating movements were carried out for 500,000 cycles and the frictional coefficients relative to the repeating cycles were measured.

Figure 4:
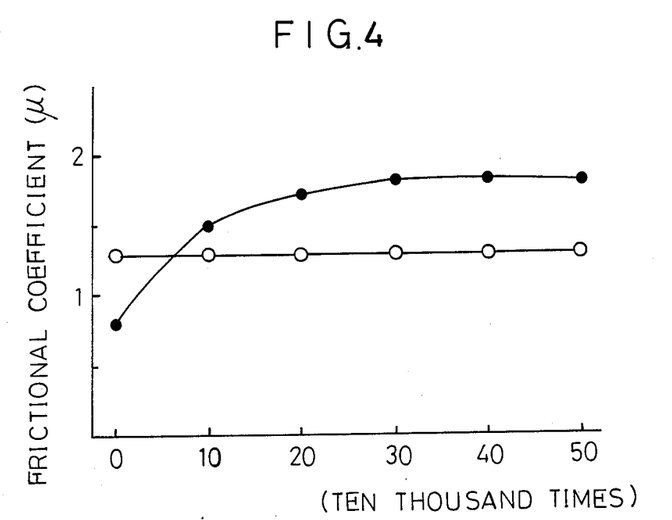
FIG. 4 is a graph showing the relationship between the cycles of the sliding movement and the frictional coefficient of the wiper blade rubber of Example 1 and a wiper blade rubber of a comparative example.

The obtained results are shown in the graph of FIG. 4. In FIG. 4, white circles represent the results of the measurement for the wiper blade rubber according to Example 1 of this invention and black circles represent the results of the measurement for the comparative conventional wiper blade rubber. As shown in FIG. 4, the frictional coefficients of the wiper blade rubber according to Example 1 are always kept at about 1.3 showing no change from the initial frictional coefficient even when the number of sliding movements arrives at about 500,000 cycles. However, in the conventional wiper blade rubber of the comparative example, although the initial frictional coefficient was as low as about 0.8, the frictional coefficient was increased as the increase in the cycle of the sliding movement and it was increased to about 1.8 at 400,000 cycles.

It is apparent from the above result that the wiper blade rubber according to Example 1 of this invention has an excellent sliding property and stable wiping operation.

EXAMPLE 2

Figure 5:
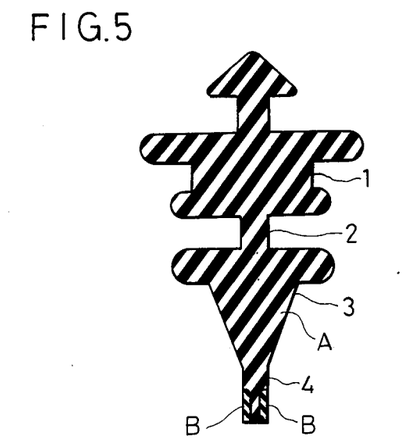
FIG. 5 is a cross sectional view of a wiper blade rubber as Example 2.

FIG. 5 shows a cross section of a wiper blade rubber as Example 2 according to this invention. In this wiper blade rubber, a lubricating synthetic rubber B was disposed to both side parts at the bottom end of the lip portion 4. The wiper blade rubber was manufactured by using the flexible rubber material and the lubricating synthetic rubber material as employed in Example 1, and by extrusion molding them in two colors such that the lubricating synthetic rubber material was disposed only to the both side parts at the bottom end of the lip portion, followed by a vulcanization in the same manner as in Example 1. In the wiper blade rubber, the lubricating synthetic rubber B was integrally disposed to both side parts at the bottom end of the lip portion 4 with a thickness of about 0.15 mm, and the same flexible rubber as that in the base portion 1 was put between them and exposed in the center at the bottom end of the lip portion 4.

In the wiper blade rubber, since the lubricating synthetic rubber B and the flexible rubber A were integrally extrusion molded and vulcanized, both of them were highly integrated and provided no risk of separation. Further, while the thickness of the usual chlorine treated layer of the conventional wiper blade rubber is as thin as about 0.01 mm, the thickness of the lubricating synthetic rubber B of this example 2 is as thick as 0.15 mm and therefore there is almost no risk that the lubricating rubber layer was abraded to the point of being completely eliminated by the sliding movement. Further, since the flexible rubber A is exposed in the center of the top end of the lip portion 4, the swing portion 3 surely swings against the base portion 1 upon inversion of the direction during reciprocating movement of the wiper, and the lip portion 4 could surely follow after the base portion 1 to move slidingly on the glass surface.

EXAMPLE 3

The cross section of a wiper blade rubber as Example 3 according to this invention is the same as that of the wiper blade rubber as shown in FIG. 1.

In the wiper blade rubber of Example 3, the base portion 1, neck portion 2, swing portion 3 and an upper end of the lip portion 4 are composed of a flexible rubber having a rubber hardness of 60 degree, and a lower portion of the lip portion 4 is composed of a hard rubber having a rubber hardness of 85 degree. The configuration and size of this wiper blade rubber are the same as those of the wiper blade rubber according to Example 1. The wiper blade rubber of this Example 3 was manufactured by the following method.

First, a rubber material having the same composition as that of the flexible rubber used in Example 1 was employed as a flexible rubber material in this Example 3.

And, an unvulcanized rubber blend composed of 100 parts by weight of a natural rubber (containing about 0.3 parts by weight of a diluent), 65 parts of FEF carbon; 3.5 parts of sulfur powder; 6 parts of a processing aid; 5 parts of zinc white; 3.5 parts of antioxidants and 1 part of a vulcanizing promoter, was sufficiently mixed using a Banbury mixer to prepare a hard rubber material of this Example 3.

Then, the above-described two kinds of rubber material was molded and vulcanized under the same conditions in the extrusion molding and vulcanization as explained in Example 1. The resulting vulcanized rubber was cut out along the center thereof with a cutting blade to obtain the wiper blade rubber according to Example 3.

On the other hand, for comparison, the same comparative wiper blade rubber as that of Example 1 was prepared, and the frictional coefficient of each of the wiper blade rubber according to this Example 3 and the comparative wiper blade rubber was measured using the same tester as that of Example 1 and in the same manner as Example 1.

Figure 6:
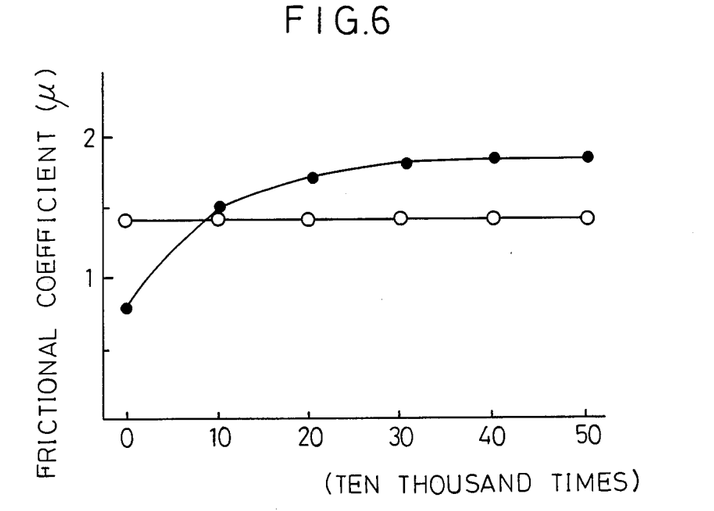
FIG. 6 is a graph showing the relationship between the cycles of the sliding movement and the frictional coefficient of a wiper blade rubber of Example 3 and the wiper blade rubber of a comparative example.

The obtained results are shown in FIG. 6. In FIG. 6, white circles represent the results of the measurement for the wiper blade rubber according to this Example 3, whereas black circles represent the results of measurement for the comparative wiper blade rubber. As shown in FIG. 6, the frictional coefficients of the wiper blade rubber according to this Example 3 are always kept at about 1.4 showing no change from the initial frictional coefficient even when the number of sliding movement arrives at about 500,000 cycles. However, in the conventional wiper blade rubber of the comparative example, although the initial frictional coefficient is as low as about 0.8, the frictional coefficient is increased as the increase in cycle of the sliding movement and it is increased to about 1.8 at 400,000 cycles.

It is evident from the above result that the wiper blade rubber according to Example 3 of this invention has an excellent sliding property.

EXAMPLE 4

The cross section of a wiper blade rubber as Example 4 according to this invention is the same as that of the wiper blade rubber shown in FIG. 5.

In this wiper blade rubber, a hard rubber B was disposed to both side parts at the bottom end of the lip portion 4. The wiper blade rubber was manufactured by using the flexible rubber material and the hard rubber material was employed in Example 3, and by extrusion molding them in two colors so as to dispose the hard rubber material to only the both side parts at the bottom end of the lip portion, followed by a vulcanization in the same manner as in Example 1. In the wiper blade rubber, the hard rubber B was integrally disposed to both side parts at the bottom end of the lip portion 4 with a thickness of about 0.17 mm, and the same flexible rubber as that of the base portion 1 was put between them and exposed in the center part at the bottom end of the lip portion 4.

According to this wiper blade rubber, the hard rubber B and the flexible rubber A were integrally extrusion molded and vulcanized. Therefore, both of them are highly integrated and provide no risk of separation.

Further, while the thickness of a chlorine treated layer of the conventional wiper blade rubber is as thin as about 0.01 mm, the thickness of the hard rubber B of this Example 4 is as thick as 0.17 mm. Therefore, there is almost no risk that the hard rubber layer is abraded to the point of being completely eliminated by the sliding movement. Moreover, since the flexible rubber A is exposed at the center part of the bottom end of the lip portion 4, the swing portion 3 and lip portion 4 surely swings against the base portion 1 upon inversion of the direction during reciprocating movement of the wiper so that each of the edges of the side parts of the lip portion 4 can contact to the glass surface reciprocally.

EXAMPLE 5

The cross section of a wiper blade rubber according to Example 5 of this invention is the same as that of the wiper blade rubber shown in FIG. 1.

In the wiper blade rubber according to Example 5, a base portion 1, a neck portion 2, a swing portion 3 and an upper end of a lip portion 4 are formed of a flexible rubber A containing no lubricant, and a lower portion of the lip portion 4 is formed of a lubricating rubber containing 30% by weight of graphite having a particle diameter of about 5μ. The configuration and size of this wiper blade rubber are the same as those of the wiper blade rubber according to Example 1. The wiper blade rubber of this Example 5 was manufactured by the following process.

First, a rubber material having the same composition as that of the flexible rubber used in Example 1 was employed as the flexible rubber in this Example 5.

To prepare the lubricating rubber in this Example, 70 parts of graphite and 10 parts of silicon oil were also added to a rubber blend of the same composition ratio as that of the aforesaid flexible rubber material and they were sufficiently mixed by a Banbury mixer in the same manner as described above.

Then, the above-described two kinds of rubber material were molded and vulcanized under the same conditions in the extrusion molding and vulcanization as explained in Example 1. The resulting rubber was cut out along the center thereof with a cutting blade to obtain the wiper blade rubber according to this Example 5.

For comparison, the same comparative wiper blade rubber as that of Example 1 was prepared, and the frictional coefficients of each of the wiper blade rubber according to this Example 5 and the comparative wiper blade rubber was measured using the tester as that of Example 1 and in the same manner as in Example 1.

Figure 7:
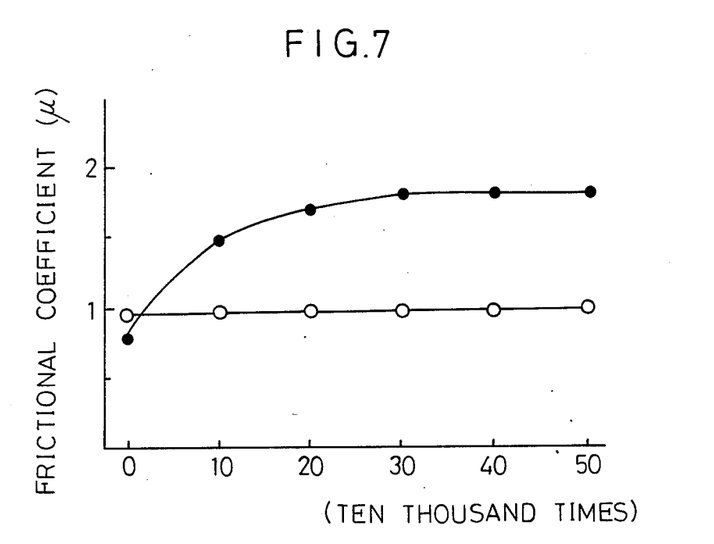
FIG. 7 is a graph showing the relationship between the cycles of the sliding movement and the frictional coefficient of a wiper blade rubber of Example 5 and the wiper blade rubber of a comparative example.

The obtained results are shown in FIG. 7. In FIG. 7, white circles represent the results of measurement for the wiper blade rubber according to this Example 5, whereas black circles represent the results of measurement for the comparative wiper blade rubber. As shown in FIG. 7, the frictional coefficient of the wiper blade rubber according to this Example 5 is always kept at about 0.9 to 1.0 showing no change from the initial frictional coefficient even when the number of sliding movements arrives at about 500,000 cycles. However, in the conventional wiper blade rubber according to the comparative example, although the initial frictional coefficient is as low as about 0.8, the frictional coefficient is increased as the increase in cycle of the sliding movement and it is increased to about 1.8 at 400,000 cycles.

It is evident from the above result that the wiper blade rubber according to Example 5 of this invention has an excellent sliding property.

EXAMPLE 6

The cross section of a wiper blade rubber according to Example 6 of this invention is the same as that of the wiper blade rubber shown in FIG. 5.

In the wiper blade rubber according to this Example 6, both side parts of the bottom end of the lip portion 4 is formed of a lubricating rubber B. This wiper blade rubber was manufactured by using the flexible rubber material and the lubricating rubber material as employed in Example 5 and by extrusion molding then in two colors so as to dispose the lubricating rubber material to only the both side parts at the bottom end of the lip portion, followed by a velcanization in the same manner as in Example 5. In the wiper blade rubber, the lubricating rubber B was integrally disposed to the both side parts of the bottom end of the lip portion 4 with a thickness of about 0.15 mm, and the same flexible rubber A as that of the base portion 1 was put between them so as to be exposed in the center part of the bottom end of the lip portion 4.

According to this wiper blade rubber, the lubricating rubber B and the flexible rubber A were integrally extrusion molded and vulcanized. Therefore, both of them are highly integrated and provide no risk of separation.

Further, while the thickness of a chlorine treated layer of the conventional wiper blade rubber is as thin as about 0.01 mm, the thickness of the lubricating rubber B of this Example 6 is as thick as about 0.15 mm. Therefore, there is almost no risk that the lubricating rubber layer was abrased to be eliminated by the sliding movement thereof. Moreover, since the flexible rubber A is exposed at the center part of the bottom end of the lip portion 4, the swing portion 3 surely swings against the base portion 1 upon invention of the direction during reciprocal movement of the wiper so that the lip portion 4 can surely follow after the base portion 1 to move slidingly on the glass surface.

EXAMPLE 7

Figure 8:
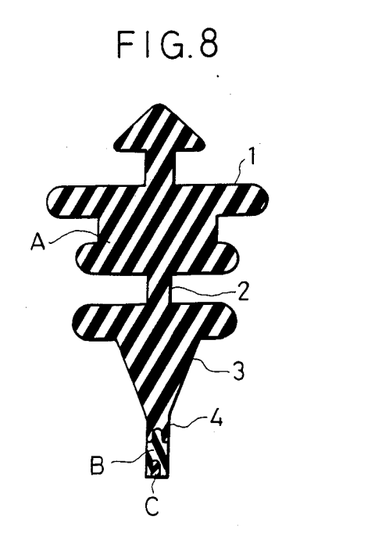
FIG. 8 is a cross sectional view of a wiper blade rubber as Example 7.

FIG. 8 shows a cross section of a wiper blade rubber according to Example 7 of this invention. The wiper blade rubber according to this Example 7 comprises a base portion 1 of a polygonal cross section, a neck portion 2, a swing portion 3 generally of a trigonal cross section and a lip portion 4 disposed to the bottom end of the swing portion 3. The base portion 1, neck portion 2, swing portion 3 and an upper portion of the lip portion 4 are formed of a flexible rubber A mainly composed of a natural rubber. A lower portion of the lip portion 4 is formed of a lubricating rubber B composed of urethane rubber and a central part of the bottom end of the lip portion 4 is formed of a high friction resistant rubber C mainly composed of a natural rubber. The wiper blade rubber has a height of about 11.5 mm, a width of about 7 mm and the lip portion 4 thereof has a thickness of 0.75 mm and a height of 1.9 mm. This wiper blade rubber was manufactured by the following method.

Figure 9:
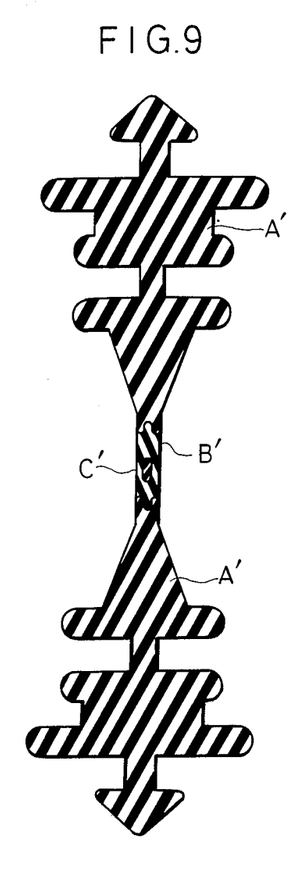
FIG. 9 is a cross sectional view of an extrusion molded product of unvulcanized rubber molded for manufacturing the wiper blade shown in FIG. 8.

An unvulcanized rubber blend A' for the flexible rubber A, composed of 100 parts of a natural rubber (containing 0.3 parts of a diluent), 30 parts of FEF carbon, 3.5 parts of powdered sulfur, 5 parts of zinc white, 2 parts of a processing aid, 3.5 parts of an aging stablizer and 0.7 parts of a vulcanization promoter, was sufficiently mixed by a Banbury mixer. A material B' for the lubricating rubber B was prepared by sufficiently mixing a rubber blend, composed of 100 parts of polyester ether (molecular weight 3000), 5 parts of 1,4-butanediol, 26 parts of xylenol block isocyanate and 2 parts of HAF carbon, in the same manner by a Banbury mixer. Further, a material C' for the high friction resistance rubber C was prepared by sufficiently mixing in the same manner by a Banbury mixer, a rubber blend composed of 100 parts of a natural rubber (containing 0.3 parts of a diluent), 25 parts of FEF carbon, 5 parts of a tackifier, 3.5 parts of powdered sulfur, 5 parts of zinc white, 2 parts of a processing aid, 3.5 parts of an aging stabilizer and 0.7 parts of vulcanization promoter. Then, the above described three kinds of rubber materials were extrusion molded in three colors, to obtain an extrusion molded product of a cross sectional configuration as shown in FIG. 9, by extruding the material A' from an extruder of a screw diameter 35 mm, the material B' from an extruder of a screw diameter 20 mm and the material C' from an extruder of a screw diameter of 20 mm under the condition of the head temperature at 70° C. The extrusion molded product has a configuration in which two wiper blade rubber pieces are joined at the bottom end of the lip portions as shown in FIG. 9. The unvulcanized high friction resistant rubber material C' and the lubricating rubber material B' being disposed at the center and the unvulcanized flexible rubber material A' was disposed at the both sides thereof. Then, the extrusion molded product was vulcanized at 180° C. for 5 minutes using a molten salt vulcanizing vessel to obtain a vulcanized rubber. Thereafter, the vulcanized rubber was cut out along the center thereof with a sharp cutting blade to prepare a wiper blade rubber according to this Example 7, the cross section of which was shown in FIG. 8.

For comparison, only the same unvulcanized flexible rubber material A' as shown in Example 7 was heat-molded under a pressure within a metal mold to prepare a wiper blade rubber. Then, the wiper blade rubber was immersed in a chlorine processing liquid consisting of 100 parts of water, 3 parts of sodium hypochlorite (effective chlorine 5 wt%) and 1 part of hydrochloric acid, for 10 minutes to chlorinate the surface thereof thereby to prepare a comparative wiper blade rubber the cross section of which was shown in FIG. 13.

Then, the frictional coefficient of each of the wiper blade rubber according to this example 7 and the comparative wiper blade rubber was measured using the same tester as that of Example 1 and in the same manner as in Example 1.

Figure 10:
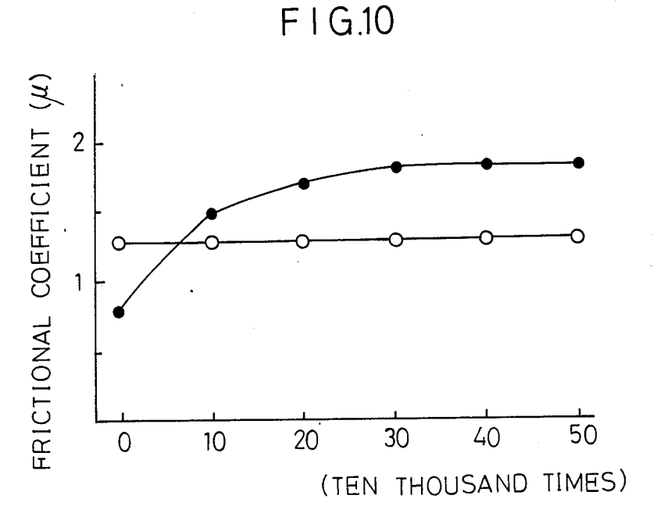
FIG. 10 is a graph showing the relationship between the cycles of the sliding movement and the frictional coefficient of the wiper blade rubber of Example 7 and the wiper blade rubber of a comparative example.

The obtained results are shown in FIG. 10. In FIG. 10, white circles represent the results of measurement for the wiper blade rubber according to this this Example 7, whereas black circles represent the results of measurement for the the comparative wiper blade rubber. It is evident from FIG. 10 that the frictional coefficients of the wiper blade rubber according to this Example 7 are always kept at about 1.3 showing no change from the initial frictional coefficient even when the number of sliding movements arrives at about 500,000 cycles.

EXAMPLE 8

FIG. 5 shows the similar cross section of the wiper blade rubber as the example 8 of this invention. In this wiper blade rubber, a lubricating rubber B was disposed on both side parts of the bottom end of the lip portion 4, and all of other portions were made of high friction resistance rubber. The wiper blade rubber was manufactured by using the high friction resistance rubber material C' and the lubricating rubber material B' as employed in Example 7, and extrusion molding them in two colors such that the lubricating rubber material B' was disposed only to the both sides at the bottom end of the lip portion, followed by a vulcanization in the same manner as in Example 7. In the wiper blade rubber, the lubricating rubber B was integrally disposed on both sides at the bottom end of the lip portion 4 to a thickness of about 0.2 mm, and the same high friction resistance rubber C (C corresponding to A in FIG. 5) as that in the base portion 1 was but between and exposed in the center at the bottom end of the lip portion 4.

In the wiper blade rubber, since the lubricating rubber B and the high friction resistance rubber C were integrally extrusion molded and vulcanized, both of them were highly integrated and provided no risk of separation. Further, while the thickness of the usual chlorine treated layer was as thin as about 0.01 mm, the thickness of the lubricating rubber B was as thick as 0.2 mm, and there was almost no risk that the lubricating rubber layer was abraded to the point of being completely eliminate by the sliding movement. Further, since the high friction resistance rubber C was exposed in the center at the bottom end of the lip portion 4, the swing portion 3 surely slides against the base portion 1 upon inversion of the direction during reciprocal movement of the wiper, and the lip portion 4 could surely follow after the base portion 1 to move slidingly on the glass surface. Furthermore, since 2-color extrusion molding could be performed, the manufacture was facilitated as compared with the wiper blade rubber in Example 7.

EXAMPLE 9

A wiper blade rubber according to Example 8 was manufactured using the following natural rubber as a main ingredient for the lubricating rubber material in the B portion of the wiper blade having the configuration as shown in FIG. 5.)

Specifically, a rubber blend composed of 100 parts of a natural rubber (containing 0.3 parts of a diluent), 30 parts of FEF carbon, 70 parts of graphite, 20 parts of silicon oil, 3.5 parts of powered sulfur, 5 parts of zinc white, 2 parts of a processing aid, 3.5 parts of an aging stabilizer, and 0.7 parts of a vulcanization promoter was sufficiently mixed using a Banbury mixer. The manufacturing process was the same as that in Example 7.

Since the wiper blade rubber according to this Example contains graphite and silicon oil, it can provide a lower frictional coefficient as compared with that in Example 7 and Example 8 to thereby improve the wiping performance.

EXAMPLE 10

Figure 11:
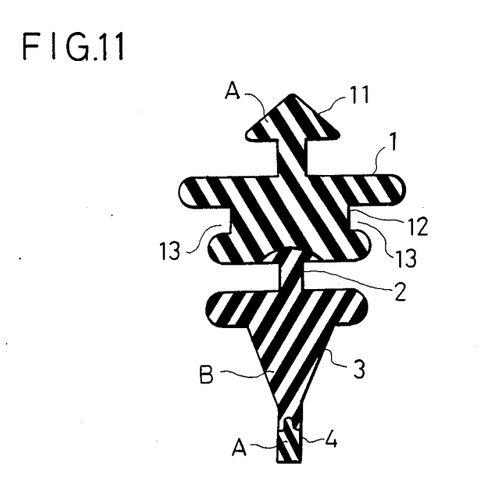
FIG. 11 is a cross sectional view of a wiper blade rubber as Example 9.

FIG. 11 shows a cross section of a wiper blade rubber according to Example 9 of this invention. The wiper blade rubber comprises a base portion 1 of a polygonal cross section; a neck portion 2; a swing portion 3 generally of a trigonal cross section and a lip portion 4 disposed to the bottom end of the swing portion 3. The base portion 1, in view of the cross section thereof, is provided with a guide part 11 of a small triangular shape at the upper end thereof and grooves 13 to serve as an engaging part at the both sides of a center part 12 thereof.

In the wiper blade rubber, most of the base portion including the guide part 11 and the engaging part and an upper part of the lip portion 4 are formed of a lubricating rubber A. The remaining part of the base portion 1, the neck portion 2, the swing portion 3 and an upper part of the lip portion 4 are formed of a flexible rubber B mainly composed of a natural rubber, a lower part of the lip portion 4 is formed of the lubricating rubber A. The configuration and size of this wiper blade rubber are the same as those of Example 1.

The aforesaid blade rubber was manufactured by the following method.

Figure 12:
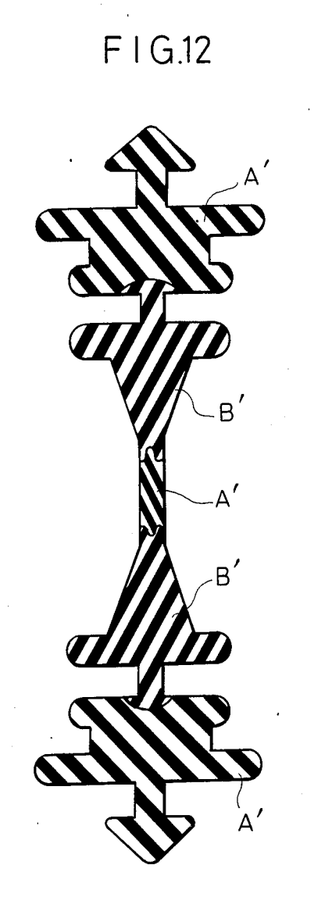
FIG. 12 is a cross sectional view of an extrusion molded product of unvulcanized rubber molded for manufacturing the wiper blade shown in FIG. 11.

An unvulcanized rubber blend, composed of 100 parts of a natural rubber (containing 0.3 parts of a diluent), 30 parts of FEF carbon; 70 parts of powdered sulfur; 5 parts of zinc white; 2 parts of a processing aid and 0.7 parts of a vulcanization promoter, was sufficiently mixed by a Barbury mixer to prepare a lubricating rubber material A'. A material B' for the flexible rubber B was prepared by sufficiently mixing an unvulcanized rubber blend, composed of 100 parts of a natural rubber; 30 parts of FEF carbon; 3,5 parts of powdered sulfur; 5 parts of zinc white; 2 parts of a processing aid; 3,5 parts of aging stabilizer and 0.7 parts of a vulcanization promoter, with a Banbury mixer. Then, the above-described two kinds of rubber material were extrusion molded in multi-colors, to obtain an extrusion molded product of a cross sectional configuration as shown in FIG. 12, by extruding the lubricating rubber material from an extruder of a screw diameter of 35 mm and by extruding the flexible rubber material from the same extruder as described above, under the condition of the head temperature at 70° C. The extrusion molded product has a configuration in which two wiper blade rubber pieces are joined at the bottom end of the respective lip portions, with the unvulcanized lubricating rubber materials A' being disposed at the center and the both sides of the extrusion molded product and with the unvulcanized flexible rubber materials B'being disposed at portions between the aforesaid center and each of the both sides at which the respective lubricating rubber materials A' are disposed. Then, the extrusion molded product was vulcanized at 180° C. for 5 minutes using a molten salt vulcanizing vessel to obtain a vulcanized rubber. Thereafter, the vulcanized rubber was cut out along the center thereof with a sharp cutting blade to prepare a wiper blade rubber according to this Example 9, the cross section of which is shown in FIG. 11.

In the wiper blade rubber according to this Example 9, since the engaging part of the base potion 1 for engagement with a rigid body is formed of the lubricating rubber A, its assembly to the rigid body is smooth and its workability is also good. Further, since the lubricating rubber A and the flexible rubber B are integrally extrusion molded and then vulcanized, both of them are highly integrated and provide no risk of separation.

What is claimed is:

1. An elongate wiper blade of a constant transverse cross section having a transverse axis, said wiper blade comprising:
    a thick base portion,
    a swing portion generally of a trigonal cross section, and
    a neck portion interposed between said base portion and said swing portion in a series along said axis, and
    a thin plate-like lip portion disposed on a free end of said swing portion;
    said base portion, said swing portion and said neck portion of said rubber being composed at least mostly of a first rubber composite and said lip portion thereof including at least one external surface portion thereof which is adapted to be placed in wiping relation with a windshield being composed at least mostly of a second rubber composite, and
    said first and second rubber composites existing as integrally extrusion molded and vulcanized elements, said second rubber composite being harder than said first rubber composite.

2. The wiper blade of claim 1, wherein:
    said first rubber composite is flexible and said second rubber composite is lubricating.

3. The wiper blade of claim 2, wherein:
    said first rubber composite is composed at least mainly of natural rubber.

4. The wiper blade of claim 3, wherein said second rubber composite is composed at least mainly of at least one constituent selected from the group consisting of urethane rubber, SBR, butyl rubber, fluoro rubber and chlorosulfonated rubber.

5. The wiper blade of claim 3, wherein:
    said lip portion has two opposite sides leading to two opposite corners, said at least one external surface portion extending on both of said opposite sides and onto both of said opposite corners.

6. The wiper blade of claim 1, wherein:
    said first rubber composite has a rubber hardness of about 50 to about 70 degrees; and
    said second rubber composite has a rubber hardness of at least 10 degrees greater than that of said first rubber composite.

7. The wiper blade of claim 6, wherein:
    said lip portion has two opposite sides leading to two opposite corners, said at least one external surface portion extending on both of said opposite sides and onto both of said opposite corners; and
    said lip portion further has an end surface portion located between said corners, this end surface portion being composed at least mainly of said first rubber composite.

8. The wiper blade of claim 1, wherein:
    both said first rubber composite and said second rubber composite contain a lubricant, with said second rubber composite containing substantially greater percentage composition of lubricant than does said first rubber composite.

9. The wiper blade rubber of claim 8, wherein:
    said lubricant is one selected from the group consisting of graphite, molybdenum disulfide, fluoro resin powder, lubricating oil and the mixture thereof.

10. The wiper blade of claim 8, wherein:
    said lip portion has two opposite sides leading to two opposite corners, said at least one external surface portion extending on both of said opposite sides and onto both of said opposite corners; and
    said lip portion further has an end surface portion located between said corners, this end surface portion being composed at least mainly of said first rubber composite.

11. The wiper blade of claim 1, wherein:
    said lip portion has two opposite sides leading to two opposite corners and an end surface portion extending between said corners, said lip portion, at said corners, being composed of a lubricating rubber having a relatively low frictional coefficient externally thereof and said lip portion, at said end surface portion having a relatively high frictional coefficient externally thereof.

12. The wiper blade of claim 11, wherein:
    said first rubber composite provides said lubricating rubber, is flexible, and is composed at least mainly of natural rubber.

13. The wiper blade of claim 11, wherein:
    said lip portion at said end surface portion has a rubber hardness that is at least 10 degrees lower than that of said lip portion at said corners.

14. The wiper blade of claim 11, wherein:
    said lip portion at said end surface portion and at said corners is composed at least mainly of natural rubber.

15. The wiper blade of claim 11, wherein:
    said lip portion at said end surface is composed at least mainly of natural rubber, and said lip portion at said corners is composed at least mainly of at least one constituent selected from the group consisting of urethane rubber, SBR, butyl rubber and fluoro rubber.

16. The wiper blade of claim 11, wherein:

said lubricating rubber contains a lubricant selected from the group consisting of graphite, molybdenum disulphide, fluoro resin and lubricating oil.

17. The wiper blade of claim 1, wherein:
said base portion is externally provided on both sides thereof with engaging portions in the form of surface discontinuities adapting the wiper blade to be mounted to a rigid, elongated, yoke-mounted windshield wiper body;
said base portion, in said engaging portions thereof, also is made of said second rubber composite; and
said second rubber composite in said engaging portions has a lower frictional coefficient externally thereof than do said neck portion and said swing portion.

18. The wiper blade of claim 17, wherein:
said first rubber composite is composed at least mainly of natural rubber.

19. The wiper blade of claim 17, wherein:
said lubricating rubber has a rubber hardness which is at least 10 degrees higher than that of said flexible rubber.

20. The wiper blade of claim 17, wherein:
said second rubber composite consists essentially of natural rubber.

21. The wiper blade of claim 17, wherein:
said second rubber composite consists essentially of at least one constituent selected from the group consisting of urethane rubber, SBR, butyl rubber, fluoro rubber and chlorosulfonated rubber.

22. The wiper blade of claim 17, wherein:
said second rubber composite contains a lubricant selected from the group consisting of: graphite, molybdenum disulphide, fluoro resin and lubricating oil.

* * * * *